(12) United States Patent
Kai

(10) Patent No.: US 7,152,875 B2
(45) Date of Patent: Dec. 26, 2006

(54) AIR BAG SYSTEM

(75) Inventor: Takeshi Kai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 10/800,074

(22) Filed: Mar. 11, 2004

(65) Prior Publication Data

US 2004/0207186 A1    Oct. 21, 2004

(30) Foreign Application Priority Data

Apr. 15, 2003   (JP) ............................. 2003-109914

(51) Int. Cl.
*B60R 21/239*    (2006.01)
(52) U.S. Cl. ................. 280/739; 280/743.1; 280/743.2
(58) Field of Classification Search ................ 280/739, 280/743.2, 743.1
See application file for complete search history.

(56) References Cited

U.S. PATENT DOCUMENTS

| | | | |
|---|---|---|---|
| 6,209,911 B1 * | 4/2001 | Igawa et al. ................ | 280/740 |
| 6,290,257 B1 * | 9/2001 | Bunce et al. ................ | 280/739 |
| 6,502,858 B1 * | 1/2003 | Amamori .................. | 280/743.2 |
| 6,648,371 B1 * | 11/2003 | Vendely et al. ............. | 280/739 |
| 6,659,499 B1 * | 12/2003 | Jenkins ....................... | 280/735 |

FOREIGN PATENT DOCUMENTS

| | | |
|---|---|---|
| JP | 2000-515090 | 11/2000 |
| JP | 2001-301556 | 10/2001 |

* cited by examiner

*Primary Examiner*—Eric Culbreth
(74) *Attorney, Agent, or Firm*—Hamre, Schumann, Mueller & Larson, P.C.

(57) ABSTRACT

A restricting member 39 disposed along an outer surface of an air bag 32 restricts an axial inflation of the air bag 32 in an earlier stage of deployment of the air bag 32, and in a later stage of deployment, the restricting member 39 allows for the inflation of the air bag 32 to its maximum capacity through breakage of brittle portions 41b. In the deployment process of the air bag 32, since vent holes 37b formed in a base fabric 37 of the air bag 32 are closed by the restricting member 39, the leakage of gas from the vent holes 37b is prevented to thereby enable a quick deployment of the air bag 32. Then, when the brittle portions 41b on the restricting member 39 break, the vent holes 37b are opened.

7 Claims, 9 Drawing Sheets

AIR BAG SYSTEM

BACKGROUND OF THE INVENTION

The present invention relates to an air bag system in which a folded air bag and an inflator are supported on a retainer, so that the air bag is inflated to be deployed into a passenger compartment of a vehicle by a gas produced by the inflator at the time of collision.

An air bag adapted to be deployed into a passenger compartment of a vehicle by a gas supplied from an inflator at the time of collision of the vehicle is provided with a vent hole, and when an internal pressure of the inflating air bag increases as a result of restraining an occupant, the gas so supplied is then released through the vent hole so as to decrease the tension of abase fabric of the air bag, whereby not only is the occupant restrained gently but also the breakage of the base fabric is prevented.

In the event that the vent hole is constituted by a simple hole opened in the base fabric, since the gas leaks from the vent hole in a process where the air bag is inflated by the gas supplied from the inflator, there is a possibility that the deployment of the air bag will be delayed.

In the Japanese translation of the PCT patent application, JP-T-2000-515090 (the term "JP-T" as used herein means a published Japanese translation of a PCT patent application), an air bag system is described where the leakage of gas in the deployment stage is prevented by sealing a vent hole with a sealing member. When an internal pressure of the inflating air bag increases as a result of restraining an occupant, a brittle area formed on the sealing member breaks so as to allow for the leakage of the gas. In this conventional air bag system, however, since the special sealing member is needed to close the vent hole in the air bag, the increased number of components and the increased number of man-hours required in processing the air bag system cause the problem of increased production costs.

SUMMARY OF THE INVENTION

The invention is made in view of the situations, and an object thereof is to enable the closing of the vent hole in the air bag without providing any special member.

With a view to attaining the object, according to a first aspect of the invention, there is proposed an air bag system in which a folded air bag and an inflator are supported on a retainer, so that the air bag is inflated to be deployed into a passenger compartment of a vehicle by a gas produced by the inflator at the time of collision, wherein an end portion of a restricting member disposed along an outer surface of the air bag is coupled to the retainer, so that in an earlier stage of deployment of the air bag, an axial inflation of the airbag is restricted by the restricting member, and in a later stage of deployment of the air bag, a brittle portion on the restricting member is broken by a tension so as to allow the air bag to inflate to its maximum capacity, and wherein the restricting member closes a vent hole formed in the air bag until the brittle portion on the restricting member is broken, and the vent hole is opened when: the brittle portion is broken.

According to the construction that is described above, since the end portion of the restricting member disposed along the outer surface of the air bag is coupled to the retainer, the occupant can be restrained gently by restricting the axial inflation of the air bag by the restricting member in the earlier stage of deployment of the air bag, and in the later stage of deployment of the air bag, the brittle portion on the restricting member is broken by the tension applied to the restricting member so as to allow the air bag to inflate to its maximum capacity to thereby exhibit its maximum occupant restraining performance.

Moreover, since the vent hole in the air bag is closed by the restricting member in the earlier stage of deployment of the air bag, the leakage of gas from the vent hole is prevented to thereby enable a quick deployment of the air bag, and since the vent hole is opened when the brittle portion on the restricting member is broken in the later stage of deployment of the air bag, the discharge of gas from the vent hole is enabled so that the occupant can be, restrained more gently. Thus, since the closing and opening of the vent hole is implemented, by making use of the restricting member, the necessity of providing a special member is obviated to thereby decrease the numbers of components and man-hours for processing.

DETAILED DESCRIPTION OF THE PREFERRED EMBODIMENTS

Modes for carrying out the invention will be described based on embodiments illustrated in the accompanying drawings.

Figure 1:
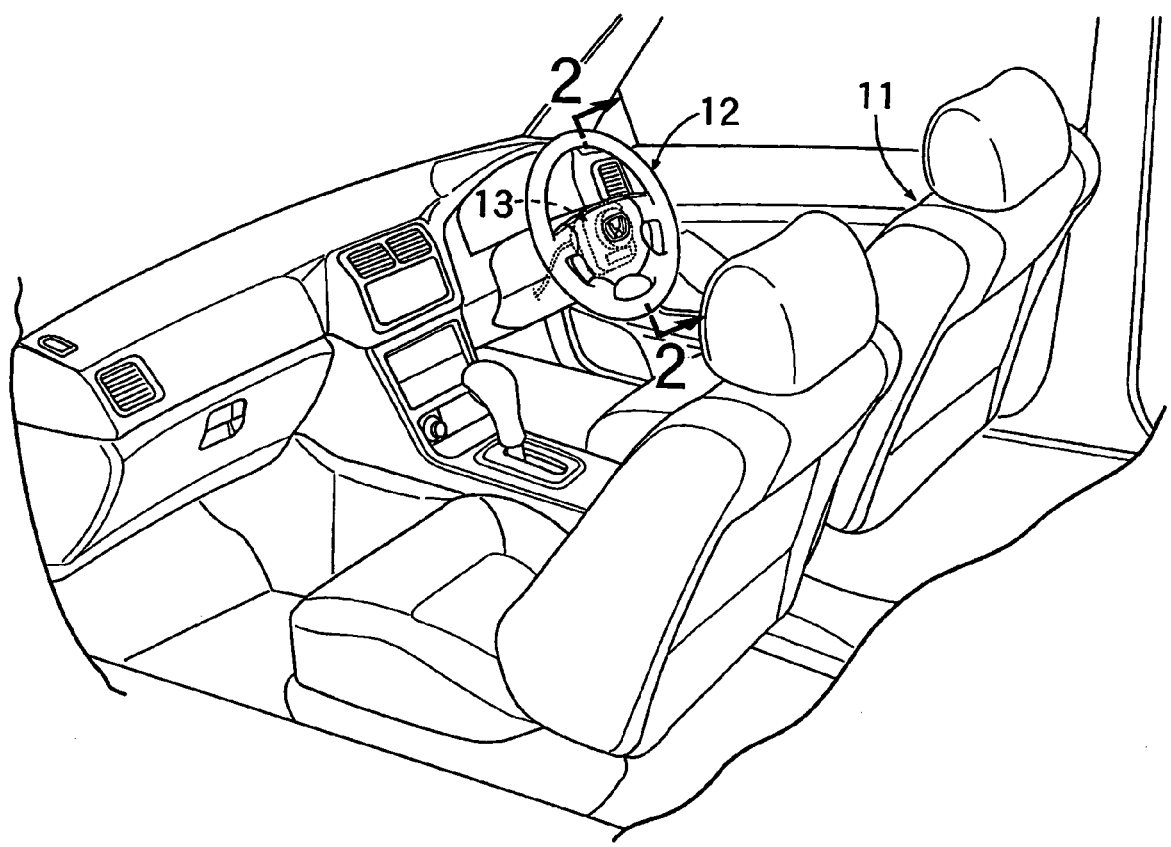
FIG. 1 is a perspective view of a front part of a passenger compartment of an automobile.
Figure 2:
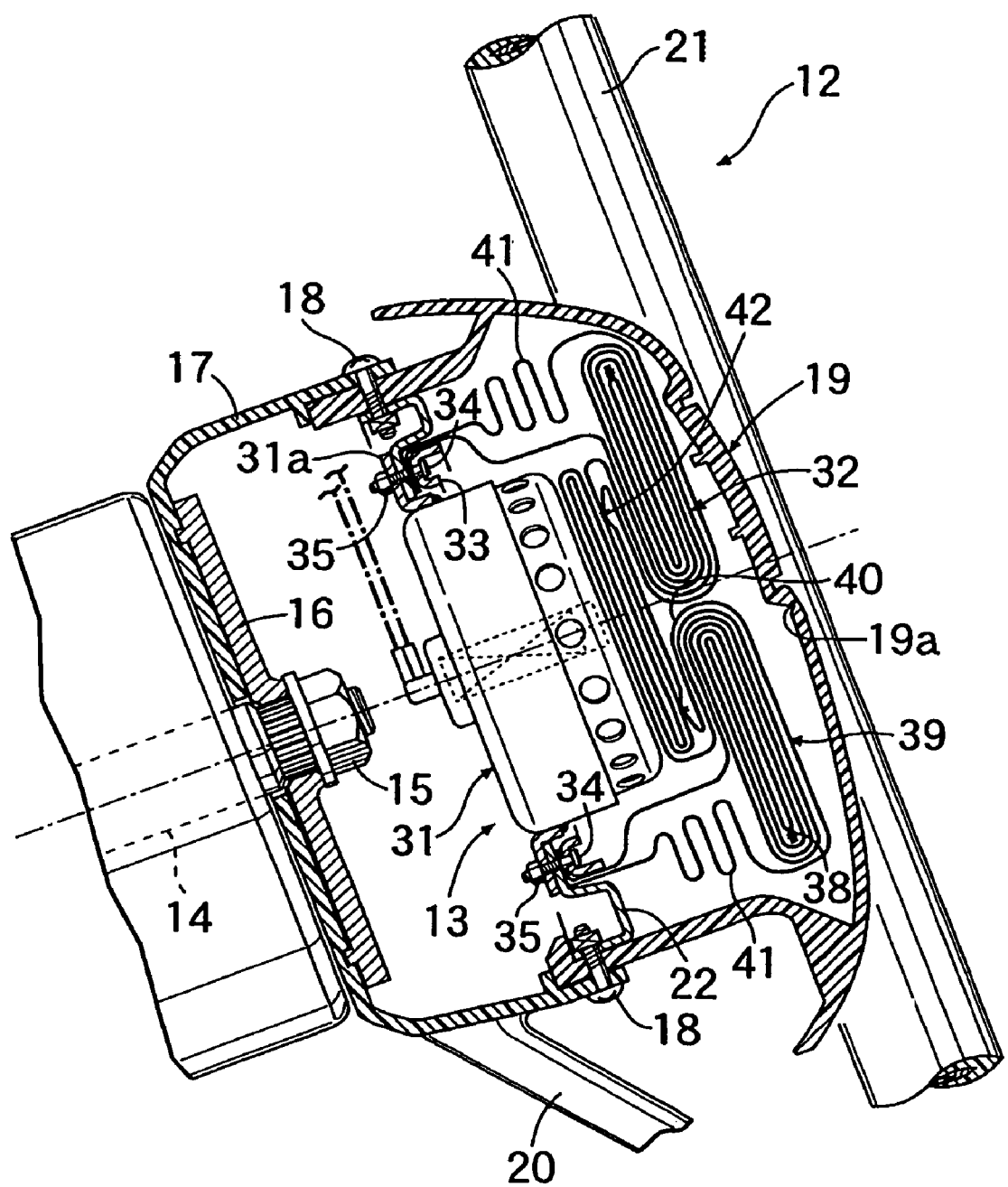
FIG. 2 is an enlarged cross-sectional view taken along the line 2—2 in FIG. 1.
Figure 3:
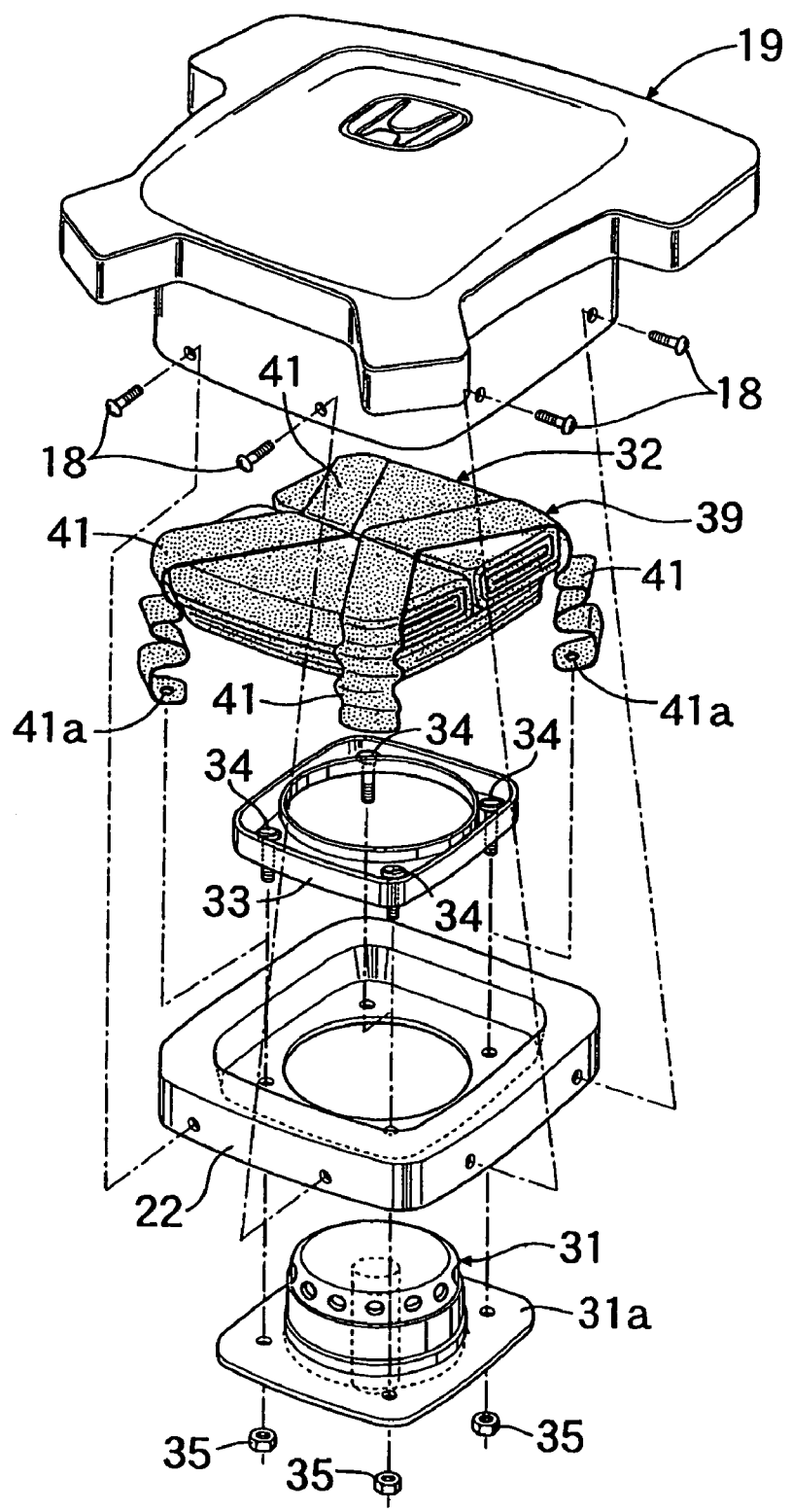
FIG. 3 is an exploded perspective view of an air bag module.
Figure 4:
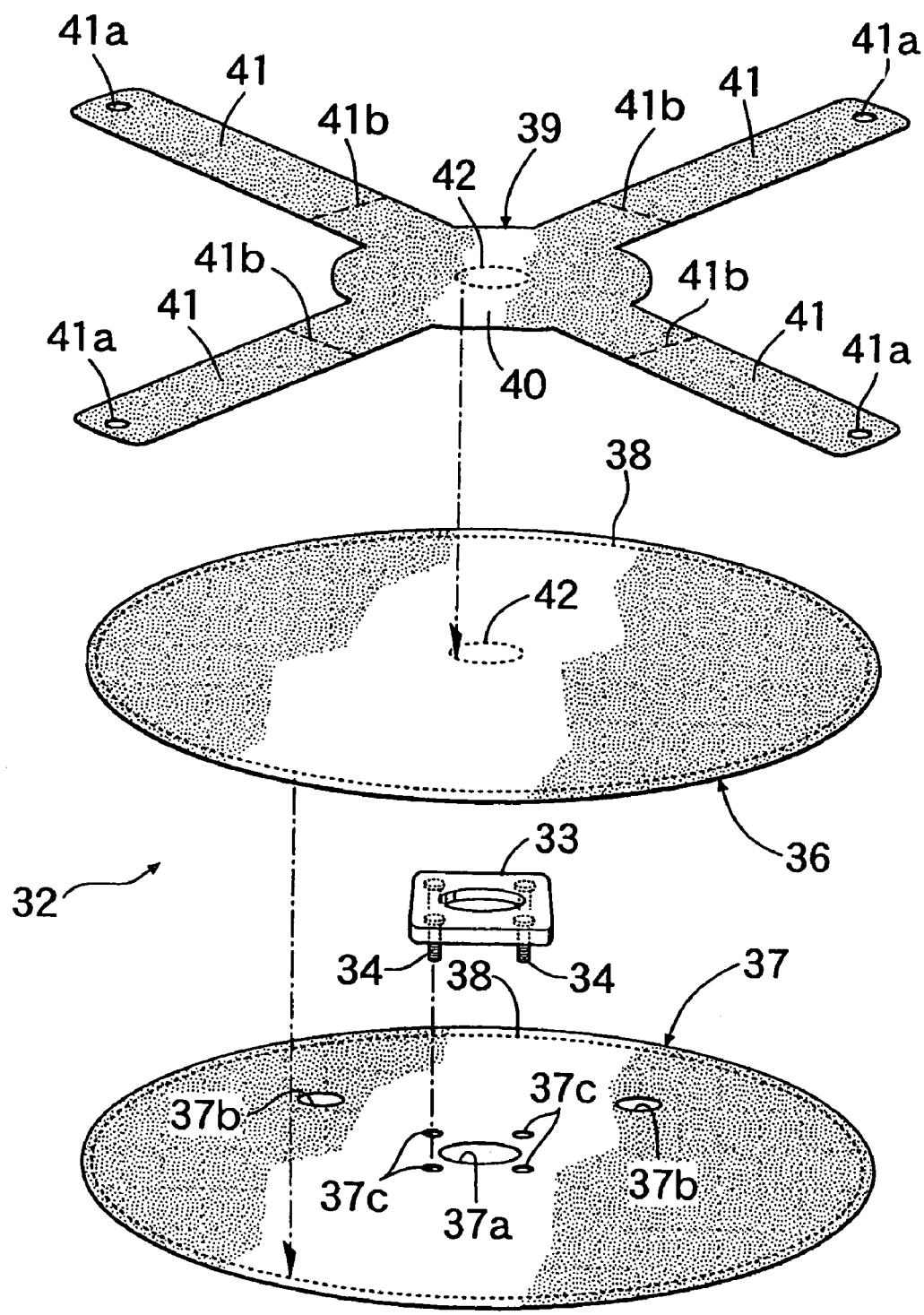
FIG. 4 is an exploded perspective view of an air bag.
Figure 5:
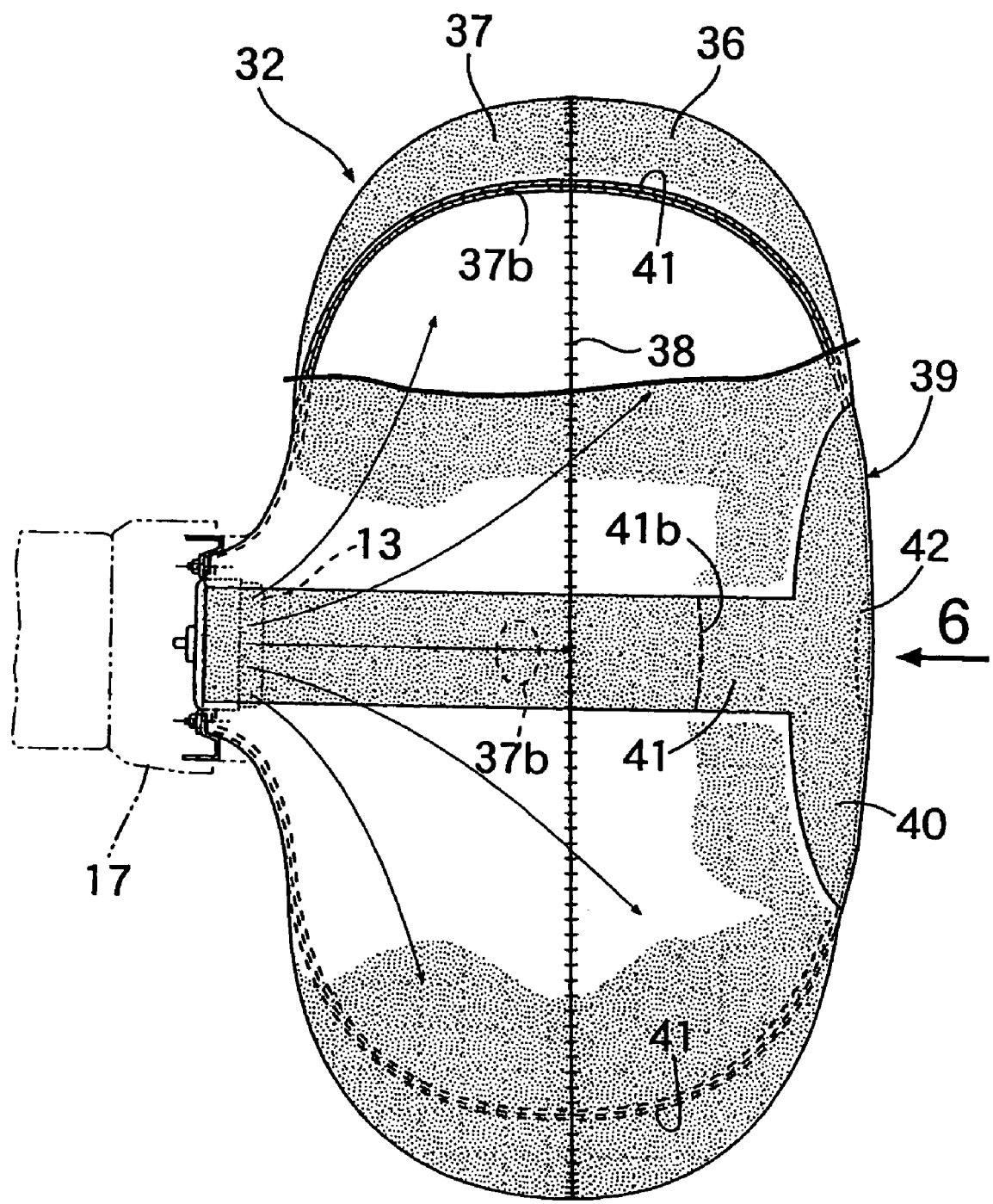
FIG. 5 is an explanatory drawing which explains the function of the air bag when it deploys (a view as seen in a direction indicated by an arrow 5 in FIG. 6).
Figure 6:
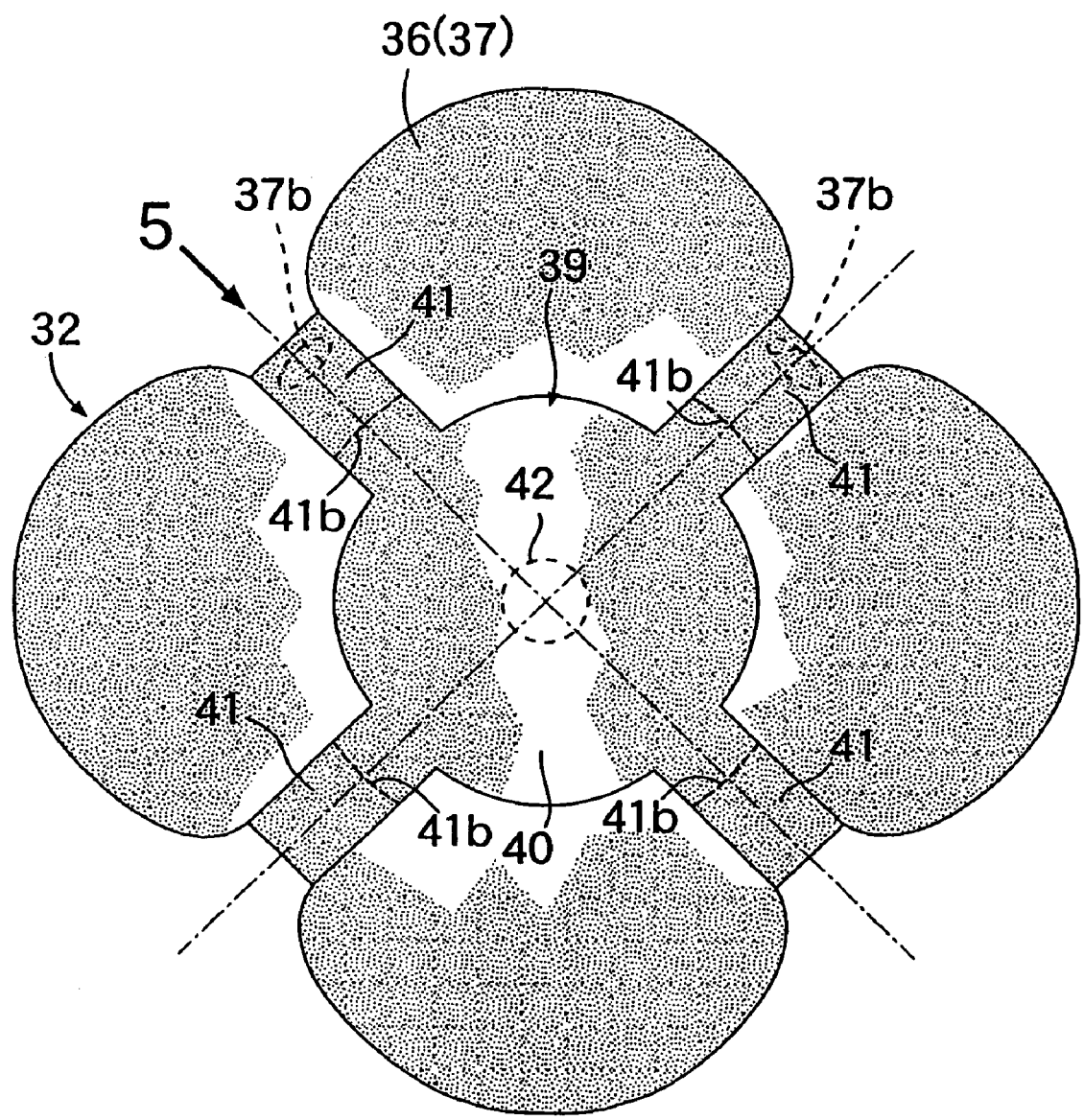
FIG. 6 is a view as seen in a direction indicated by an arrow 6 in FIG. 5.
Figure 7:
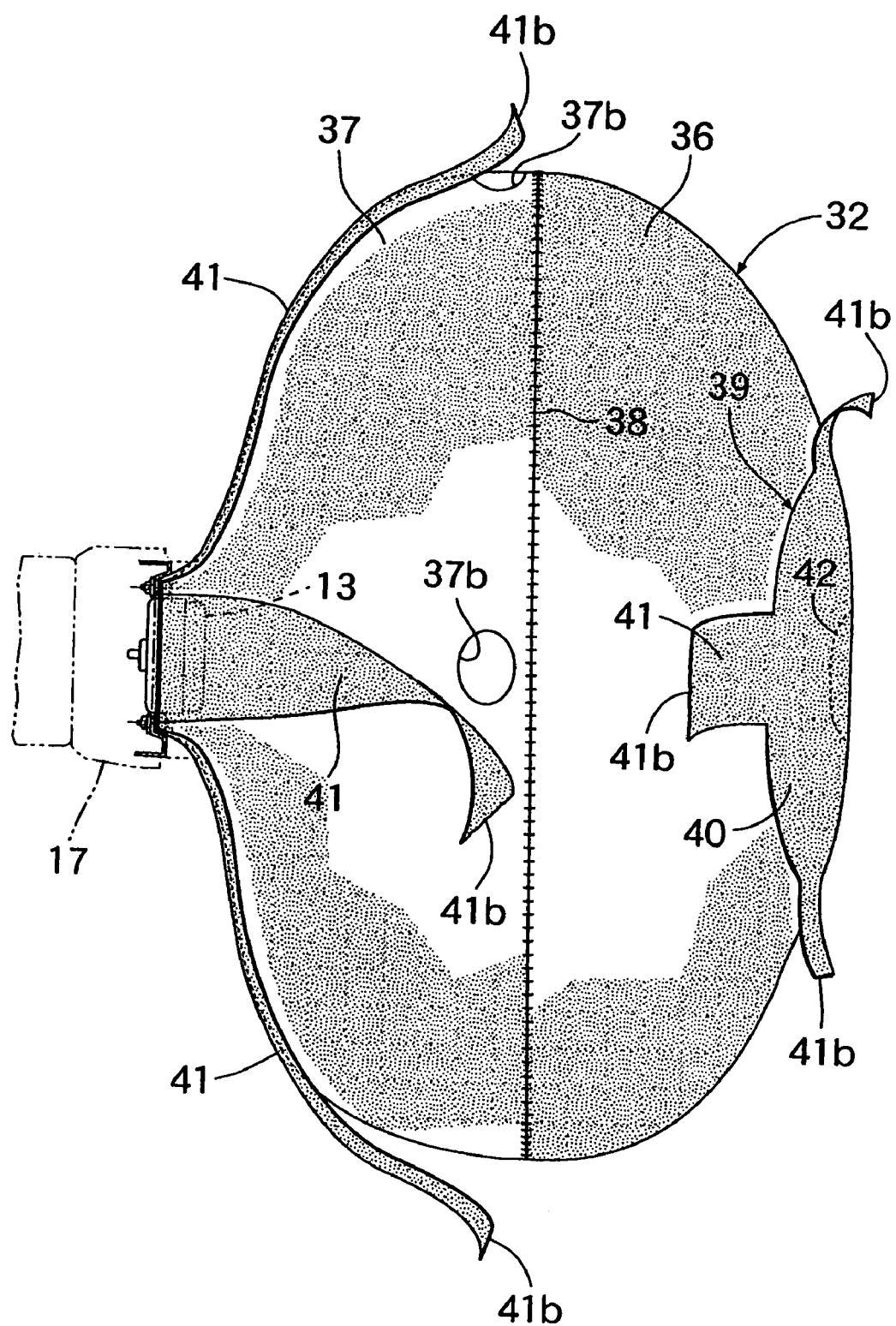
FIG. 7 is an explanatory drawing explaining the function of the air bag when restricting fabrics are broken, which corresponds to FIG. 5.

FIGS. 1 to 7 illustrates a first embodiment, in which FIG. 1 is a perspective view of a front part of a passenger compartment of an automobile, FIG. 2 is an enlarged cross-sectional view taken along the line 2—2 in FIG. 1, FIG. 3 an exploded perspective view of an air bag module, FIG. 4 is an exploded perspective view of an air bag, FIG. 5 is an explanatory drawing which explains the function of the air bag when it deploys (a view as seen in a direction indicated by an arrow 5 in FIG. 6), FIG. 6, is a view as seen in a direction indicated by an arrow 6 in FIG. 5, and FIG. 7 is an explanatory drawing explaining the function of the air bag when restricting fabrics are broken, which corresponds to FIG. 5.

As shown in FIG. 1, an air bag module 13 for a driver's seat 11 is accommodated in the interior: of a steering wheel 12 disposed in front of the driver's seat 11.

As shown in FIGS. 2 and 3, the steering wheel 12 includes a boss portion 16 fixed to a rear end of a steering shaft 14 with a nut 15, a front cover 17 fixed to the boss portion 16, a rear cover 19 fixed to an inner side of the front cover 17 at a rear end thereof with bolts 18, a plurality of spoke portions 20 extending radially from the front cover 17 and a steering wheel main body portion 21 which continues from radially outward ends of the spoke portions 20 and extends circumferentially. A retainer 22 is fastened to an inner circumferential surface of the rear cover 19 with the bolts 18, and the air bag module 13 is supported on the retainer 22. A thin tearable line 19a (refer to FIG. 2) is formed in an inner surface of the rear cover 19 in such a manner as to be torn when an air bag 32 is inflated.

The air bag module 13 includes an inflator 31 filled with a propelling powder which generates a high-pressure gas when burned, the air bag 32 formed by sewing together pieces of base fabric and a fixing-ring 33 to which a base portion of the air bag 32 is fixed. A flange 31a formed around an outer circumference of the inflator 31 and the fixing ring 33 are superimposed on front and rear sides of the retainer 22, respectively, so as to be fixed thereto with bolts 34 and nuts 35 which are provided on the fixing ring 33. As this occurs, the base portion of the air bag 32 is held between the rear side of the retainer 22 and the fixing ring 33 so as to be secured in place therebetween.

As shown in FIG. 4, the air bag 32 formed into a circular shape includes a first basic fabric 36 positioned on a rear side (a side facing the occupant) of the air bag 32 and a second base fabric 37 which is overlapped on a front side of the first base fabric 36, and the first and second fabrics 36, 37 are sewn together at a sewing portion 38 situated along outer circumferences of the first and second base fabrics 36, 37. A circular opening 37a which surrounds the inflator 31, two vent holes 37b, 37b for releasing part of the gas in a later stage of deployment of the air bag 32, and four bolt holes 37c for allowing four bolts 34 to pass therethrough, respectively, are formed in a center of the second base fabric 37 which constitutes the base portion of the air bag 32.

A fabric restricting member 39 disposed on an outer surface of the air bag 32 includes a circular fixing portion 40 and four restricting fabrics 41 which extend radially from an outer circumference of the fixing portion 40 at intervals of 90°, and the fixing portion 40 is overlapped on an outer surface of the first base fabric 36 which faces the occupant and is sewn thereto at a sewing portion 42. A bolt hole 41a is formed in a distal end of each restricting fabric 41, and the restricting member 39 is fastened to the retainer 22 with the bolts 34 which pass through the bolt holes 41a so formed. In addition, a sewing line-like brittle portion 41b is formed at an appropriate position on each restricting fabric 41 in such a manner as to be broken when a tension applied to the restricting fabric 41b reaches or exceeds a predetermined value.

Thus, in the event that an acceleration which is equal to or greater than a predetermined value is detected at the time of collision of the vehicle, the inflator 31 is ignited, and the folded air bag 32 starts to be inflated by a gas produced by the inflator 31. When a pressure resulting from the inflation of the air bag 32 is applied to the rear cover 19, the rear cover 19 breaks at the tearable line 19a, and the air bag 32 is allowed to deploy into the passenger compartment from an opening formed by the breakage of the rear cover 19.

As shown in FIGS. 5 and 6, in an earlier stage of deployment of the air bag 32, since an outer circumferential portion of the air bag 32 which is attempting to inflate is restricted by the four restricting fabrics 41, the inflation of the air bag 32 in an axial direction thereof (in a direction towards the occupant) is restricted. As a result, the deployment speed of the airbag 32 in the axial direction is decreased, and even if the occupant is situated close to the steering wheel 11, since the restraining force of the air bag 32 is prevented from increasing excessively, the occupant can be restrained gently.

In the earlier stage of deployment of the air bag 32, of the four restricting fabrics 41, the upper two restricting fabrics 41, close the two vent holes 37b formed in the second base fabric 37, preventing the leakage of gas from the two vent holes 37b, which enables a quick deployment of the air bag 32.

In a later stage of deployment of the air bag 32, in the event that a tension applied to the restricting fabrics 41 exceeds a predetermined value, the brittle portions 41b of the restricting fabrics 41 are broken by the tension so applied as shown in FIG. 7, whereby the air bag 32 is released from the restriction and is allowed to inflate to its maximum capacity to thereby exhibit its maximum occupant restraining performance.

Thus, the deployment speed of the air bag 32 in the axial direction is restricted by the function of the restricting fabrics 41 in the earlier stage of deployment of the air bag 32, and in the later stage of deployment of the air bag 32, the air bag 32 is allowed to inflate to its maximum capacity, whereby the sufficient restraining performance can be secured while restraining the occupant gently. Then, when the brittle portions 41b of the restricting fabrics 41 are broken, the vent holes 37b, 37b which are closed by the two restricting fabrics 41, 41 until then are opened, whereby the gas existing within the air bag 32 whose internal pressure is increased as a result of restraining the occupant is discharged from the vent holes 37b, 37b, so that the occupant can be restrained more gently, and the breakage of the first and second base fabrics 36, 37 which would otherwise result due to an excessive tension can be prevented. Moreover, since the vent holes 37b, 37b are closed by making use of the existing restricting fabrics 41, there is needed no special member for closing the vent holes 37b, 37b, there by making it possible to reduce the numbers of components and man-hours for processing.

Figure 8:
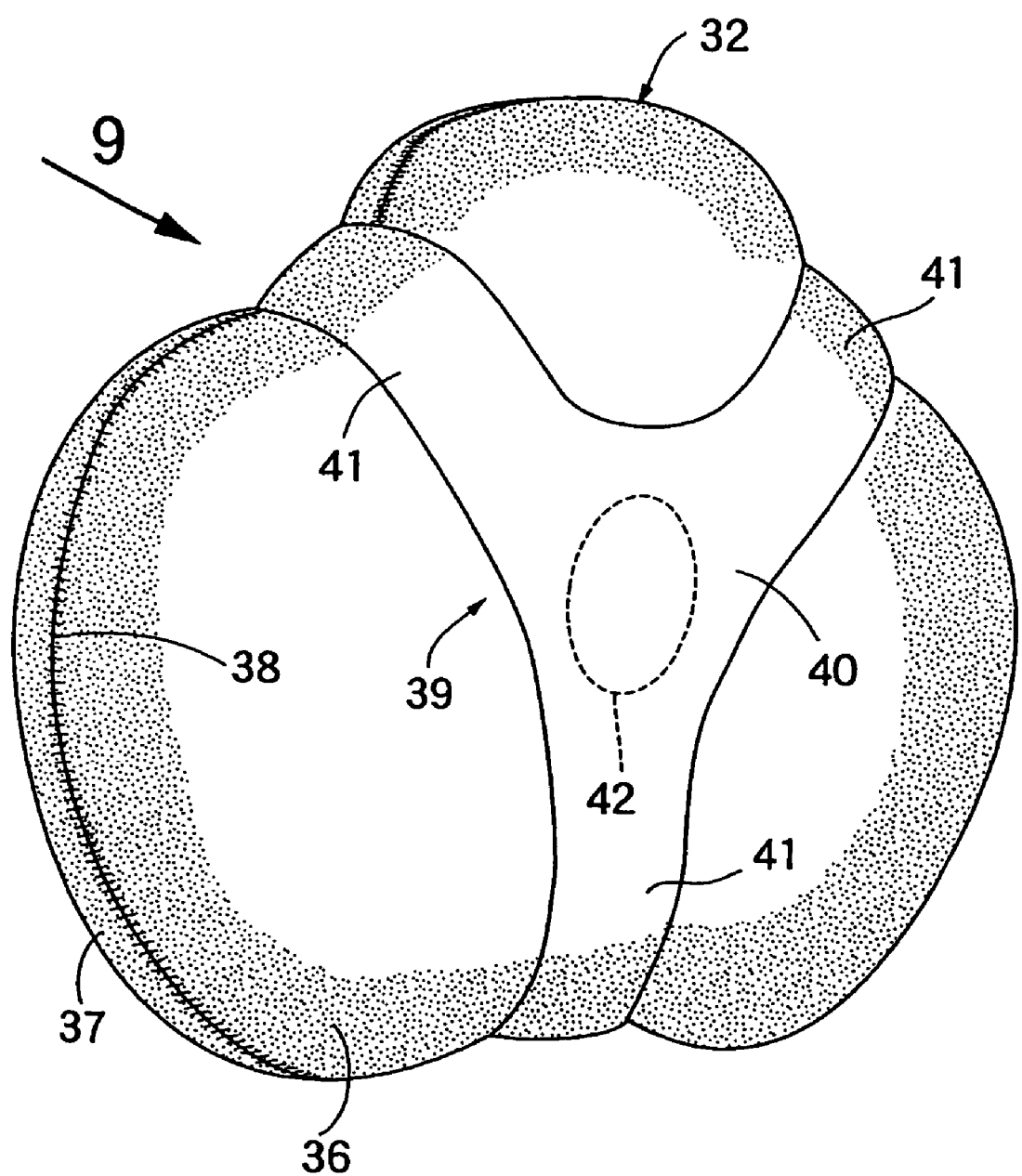
FIG. 8 is a perspective view illustrating a deployment process of an air bag according to a second embodiment which is seen from a passenger compartment side.
Figure 9:
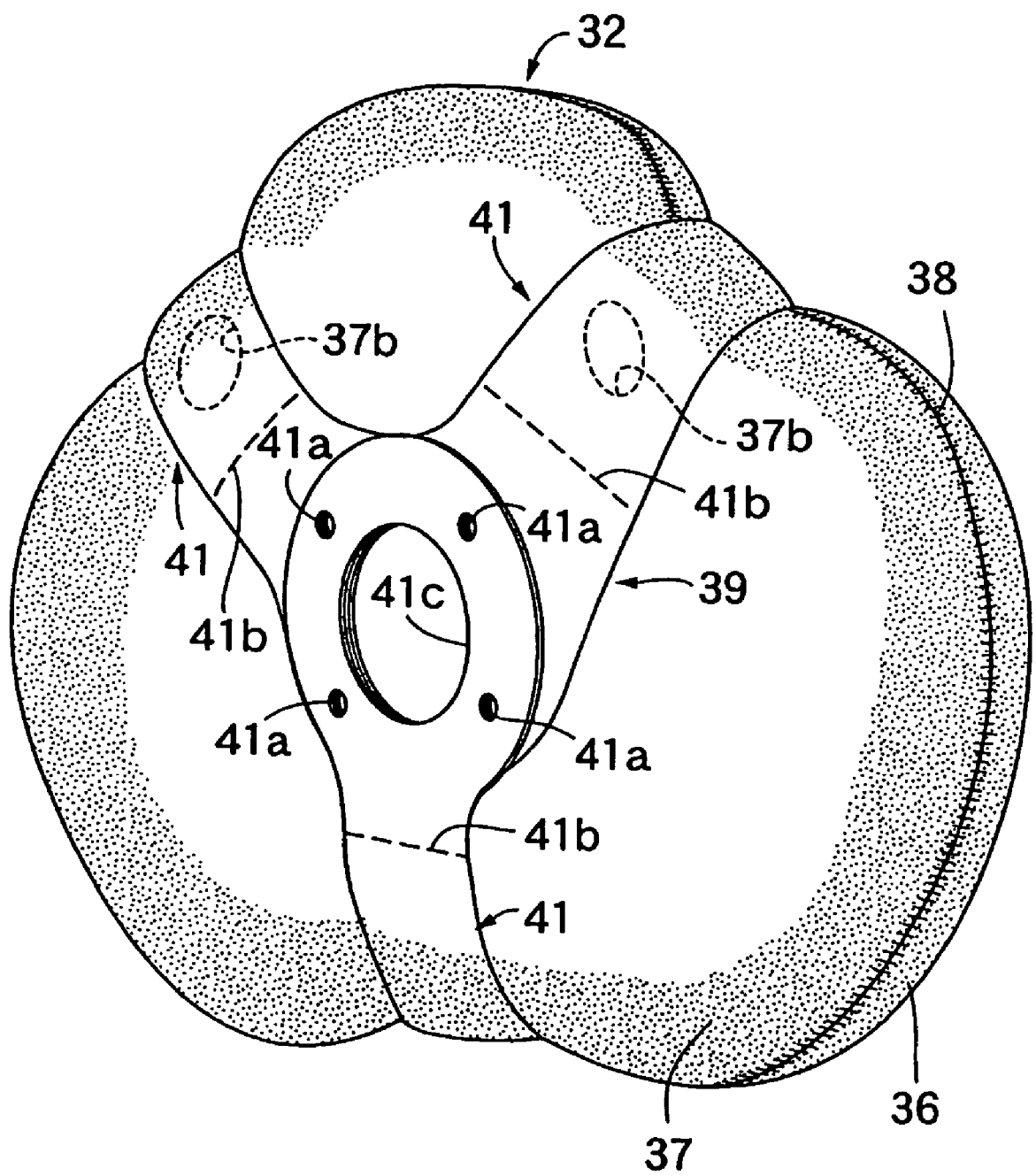
FIG. 9 is a view seen in a direction indicated by an arrow 9 in FIG. 8.

Next, a second embodiment of the invention will be described based on FIGS. 8 and 9.

While in the first embodiment the restricting member 39 has the four restricting fabrics 41 which extend radially at intervals of 90°, a restricting member 39 according to a second embodiment of the invention has three restricting fabrics 41 which extend radially at intervals of 120°. Circular openings 41c are formed in distal ends of the respective restricting fabrics 41 in such a manner as to be overlapped each other so as to be fixed to the fixing ring 33, and brittle portions 41b adapted to be broken in association with an increase in tension are formed in the vicinity of the openings 41c, respectively. Of the three restricting fabrics 41, the upper two restricting fabrics 41, 41 are disposed at positions where the vent holes 37b, 37b in the second base fabric 37 of the air bag 32 which is in a deployment process are closed.

Thus, a similar function and advantage to those attained in the first embodiment can also be attained by the second embodiment.

Thus, while the embodiments of the invention are described in detail heretofore, the invention can be modified variously with respect to design without departing from the spirit and scope of the invention.

For example, while the embodiments are illustrated as being applied to the air bag module 13 for the driver's seat, the invention can be applied to an air bag module for use for a front passenger's seat or any other locations of the vehicle.

In addition, the number and position of the vent holes 37*b* are not limited to those of the embodiments but can be modified appropriately.

Additionally, the brittle portion 41*b* can be provided at any position on the restricting fabric 41, and the construction thereof is not limited to the sewing line. For example, the brittle portion 41*b* may be made partially narrow or thin.

Furthermore, the material of the restricting member 39 is not limited to fabric but other materials such as paper may be used.

Thus, according to the first aspect of the invention, since the end portions of the restricting member disposed along the outer surface of the air bag are coupled to the retainer, the occupant can be restrained gently by restricting the axial inflation of the air bag by the restricting member in the earlier stage of deployment of the air bag, and in the later stage of deployment of the air bag, the brittle portions on the restricting member are broken by the tension applied to the restricting member so as to allow the air bag to inflate to its maximum capacity to thereby exhibit its maximum occupant restraining performance.

Moreover, since the vent holes in the air bag are closed by the restricting member in the earlier stage of deployment of the air bag, the leakage of gas from, the vent holes is prevented to thereby enable a quick deployment of the air bag, and since the vent holes are opened when the brittle portions on the restricting member are broken in the later stage of deployment of the air bag the discharge of gas from the vent holes is enabled so that the occupant can be restrained more gently. Thus, since the closing and opening of the vent holes is implemented by making use of the restricting member, the necessity of providing a special member is obviated to thereby decrease the numbers of components and man-hours for processing.

What is claimed is:

1. An air bag system comprising:
    a retainer,
    a folded air bag supported on the retainer,
    an inflator supported on the retainer, the air bag being inflated to be deployed into a passenger compartment of a vehicle by a gas produced by the inflator during a collision, and
    a restricting member including a fixing portion and a plurality of restricting fabrics extending along an outer surface of the air bag, said fixing portion being fixed to the air bag, said plurality of restricting fabrics having brittle portions and end portions.
    wherein the end portions are coupled to the retainer, so that in an earlier stage of deployment of the air bag, an axial inflation of the air bag is restricted by the restricting member, and in a later stage of deployment of the air bag, the brittle portions are broken by a tension so as to allow the air bag to inflate to its maximum capacity, and
    the restricting member closes a vent hole formed in the air bag until the brittle portions on the restricting member are broken, and the vent hole is opened when the brittle portions are broken.

2. The air bag system as set forth in the claim 1, wherein the brittle portion is provided at any position on the restricting fabric.

3. The air bag system as set forth in the claim 1, wherein the restricting member is made of fabric.

4. An air bag system comprising:
    a retainer,
    a folded air bag supported on the retainer,
    an inflator supported on the retainer, the air bag being inflated to be deployed into a passenger compartment of a vehicle by a gas produced by the inflator during a collision, and
    a restricting member including a restricting fabric disposed along an outer surface of the air bag, the restricting member including four restricting fabrics which extend radially at intervals of 90° and
    a brittle portion on the restricting member, wherein
    an end portion of the restricting member is coupled to the retainer, so that in an earlier stage of deployment of the air bag, an axial inflation of the air bag is restricted by the restricting member, and in a later stage of deployment of the air bag, the brittle portion is broken by a tension so as to allow the air bag to inflate to its maximum capacity, and
    the restricting member closes a vent hole formed in the air bag until the brittle portion on the restricting member is broken, and the vent hole is opened when the brittle portion is broken.

5. The air bag system as set forth in the claim 4, wherein the brittle portion is provided at any position on the restricting fabric.

6. An air bag system comprising:
    a retainer,
    a folded air bag supported on the retainer,
    an inflator supported on the retainer, the air bag being inflated to be deployed into a passenger compartment of a vehicle by a gas produced by the inflator during a collision, and
    a restricting member including a restricting fabric disposed along an outer surface of the air bag, the restricting member including three restricting fabrics which extend radially at intervals of 120°, and
    a brittle portion on the restricting member, wherein
    an end portion of the restricting member is coupled to the retainer, so that in an earlier stage of deployment of the air bag, an axial inflation of the air bag is restricted by the restricting member, and in a later stage of deployment of the air bag, the brittle portion is broken by a tension so as to allow the air bag to inflate to its maximum capacity, and
    the restricting member closes a vent hole formed in the air bag until the brittle portion on the restricting member is broken, and the vent hole is opened when the brittle portion is broken.

7. The air bag system as set forth in the claim 6, wherein the brittle portion is provided at any position on the restricting fabric.

* * * * *